G. JOHNSON AND E. NELSON.
NUT LOCK.
APPLICATION FILED APR. 16, 1920.

1,349,768.

Patented Aug. 17, 1920.

Witnesses
William R. Piper
C. L. Osgood

Inventors
G. Johnson and
E. Nelson
By H. J. Sanders
Atty.

UNITED STATES PATENT OFFICE.

GUSTAF JOHNSON AND EIGNAR NELSON, OF SEATTLE, WASHINGTON.

NUT-LOCK.

1,349,768.      Specification of Letters Patent.      Patented Aug. 17, 1920.

Application filed April 16, 1920. Serial No. 374,336.

*To all whom it may concern:*

Be it known that we, GUSTAF JOHNSON and EIGNAR NELSON, citizens of Sweden, and residing at Seattle, in the county of King and State of Washington, have jointly invented certain new and useful Improvements in Nut-Locks, of which the following is a specification.

This invention relates to improvements in nut locks and its prime object is to provide simple means for effectually locking a nut upon a bolt in any adjusted position. A further object is to provide a nut lock of few parts that is cheap to manufacture; and one wherein the nut can be released from the bolt, when desired, without damage to either the nut or bolt. With the foregoing and other objects in view the invention consists in the combination and arrangement of parts to be hereinafter fully described, pointed out in the appended claim and illustrated in the accompanying drawing which forms a part of this specification and in which—

Figure 1:
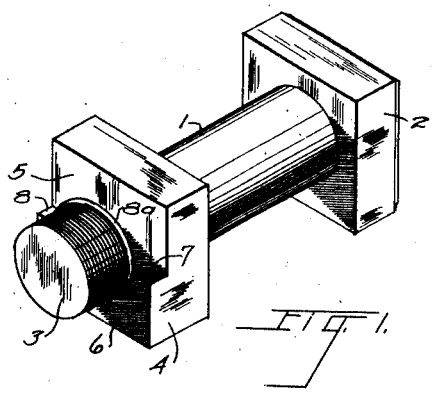
Figure 2:
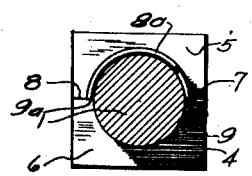
Figure 3:
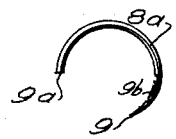

Figure 1 is a perspective view of our invention illustrating its application. Fig. 2 is an end view of Fig. 1, and, Fig. 3 is a view of the curved spring stop employed.

Like reference characters denote corresponding parts throughout the several views.

The reference numeral 1 denotes an ordinary bolt having the head 2 and the threaded end 3. The nut 4 is adapted for engagement with the bolt in the usual manner, said nut having one face recessed to form the depressed portion 5 and the relatively raised portion 6, the beveled shoulder 7 and the straight shoulder 8 marking the junction of the portions 5, 6. A curved spring stop $8^a$ is formed with notches $9^b$ at one end, with a pointed end 9 and a non-pointed end $9^a$ and is adapted to partially encircle the bolt 1 at its threaded end. The body portion of the spring stop need not be disposed necessarily in the threads of the bolt but its ends are disposed between the bolt threads, the purpose of the stop being to prevent the nut from creeping off the bolt or being forced off the same.

The spring stop is preferably placed so that its non-pointed end will engage with the nut should the same tend to creep off the bolt, the pointed end of the stop together with the notched portion $9^b$ will then bite into the bolt and securely anchor the nut against further retrograde movement. To remove the nut from the bolt the spring stop may be forced off with a screw driver or the like.

What is claimed is:—

In a nut lock, a bolt, a nut having one of its faces formed with a raised and a depressed portion, said portions being separated by a straight and a beveled shoulder, and a spring stop having one pointed end and one non-pointed end and adapted to partially encircle said bolt and for engagement terminally with either of the said shoulders and with the bolt threads.

In testimony that we claim the foregoing as our own we have hereto affixed our signatures in the presence of two subscribing witnesses.

GUSTAF JOHNSON.
                EIGNAR NELSON.

Witnesses:
  VICTOR LUND,
  CARL J. LJUNGGREN.